United States Patent
Welling et al.

(10) Patent No.: US 6,481,688 B1
(45) Date of Patent: Nov. 19, 2002

(54) HOSPITAL BED COMMUNICATION AND CONTROL DEVICE

(75) Inventors: Jeffrey R. Welling, Batesville, IN (US); Michael E. Poehner, West Harrison, IN (US)

(73) Assignee: Hill-Rom Services, Inc., Wilmington, DE (US)

( * ) Notice: Subject to any disclaimer, the term of this patent is extended or adjusted under 35 U.S.C. 154(b) by 0 days.

(21) Appl. No.: 09/650,526

(22) Filed: Aug. 30, 2000

Related U.S. Application Data

(63) Continuation of application No. 08/778,961, filed on Jan. 6, 1997, now Pat. No. 6,131,868, which is a continuation of application No. 08/409,940, filed on Mar. 23, 1995, now Pat. No. 5,592,153, which is a continuation of application No. 07/984,208, filed on Nov. 30, 1992, now abandoned.

(51) Int. Cl.⁷ .................. F16M 11/00; A47B 71/00; G10L 21/00
(52) U.S. Cl. .................. 248/694; 248/276.1; 5/600; 340/825.19; 704/275
(58) Field of Search .................. 248/276.1, 278.1, 248/281.11, 282.1, 283.1, 284.1, 694; 5/503.1, 507.1, 600, 425, 618, 617, 624, 424; 340/825.19; 704/275

(56) References Cited

U.S. PATENT DOCUMENTS

| | | |
|---|---|---|
| 1,915,985 A | 6/1933 | Edwards |
| 2,208,945 A | 7/1940 | Miller |
| 2,384,325 A | 9/1945 | Marsan |
| 2,439,009 A | 4/1948 | Kujawski |
| 2,605,155 A | 7/1952 | Lewis |
| 2,607,881 A | 8/1952 | Anderson |
| 2,644,961 A | 7/1953 | Hillenbrand et al. |
| 3,030,128 A | 4/1962 | Versen |
| 3,112,968 A | 12/1963 | Cotton et al. |

(List continued on next page.)

FOREIGN PATENT DOCUMENTS

| | | |
|---|---|---|
| CA | 789207 | 7/1968 |
| DE | 2 037 932 | 2/1972 |
| DE | 32 40 145 C2 | 5/1984 |
| DE | 33 10463 A1 | 9/1984 |
| DE | 33 14938 A1 | 10/1984 |
| DE | 8614525 | 5/1987 |
| DE | 41 27 013 A1 | 2/1993 |
| DE | 41 27 014 A1 | 2/1993 |
| DE | 42 14 143 A1 | 11/1993 |
| EP | 0 363 555 B1 | 4/1990 |
| EP | 0 376 066 | 7/1990 |
| EP | 0 568 020 A3 | 11/1993 |

OTHER PUBLICATIONS

US 5,152,022, 10/1992, Vrzalik (withdrawn)
Prentke Romich Company brochure entitled "Hospital Environmental Control System".
Prentke Romich Company brochure entitled "Hospital Environmental Control System (HECS)", 6/83.
Prenkte Romich Company Operator's Manual for HECS–2 Hospital Environmental Control System.
Prente Romich blueprint "Hospital Environmental Control System HECS–2," May 20, 1985.
Joerns Healthcare's color marketing brochure entitled "Roomate".

(List continued on next page.)

Primary Examiner—Anita King
(74) Attorney, Agent, or Firm—Bose McKinney & Evans LLP

(57) ABSTRACT

A communication and control device for attachment to the head end of a hospital bed for positioning a voice activated communication and control module adjacent a patient's head. The device comprises an arm having first, second and third arm segments, with first and second articulating joints connecting the first and second and second and third arm segments respectively. A securing mechanism releasably secures the first arm segment to the bed, and a third articulating joint connects the first arm segment to the securing mechanism. The first articulating joint accommodates electrical transmission wire substantially within the joint.

59 Claims, 6 Drawing Sheets

U.S. PATENT DOCUMENTS

| | | | |
|---|---|---|---|
| 3,200,416 A | | 8/1965 | Warrick |
| 3,243,497 A | | 3/1966 | Kendall et al. |
| 3,304,116 A | | 2/1967 | Stryker |
| 3,358,957 A | | 12/1967 | Lindenmuth |
| 3,662,981 A | | 5/1972 | Hogrebe |
| 3,742,527 A | | 7/1973 | Johnston et al. |
| 3,757,363 A | | 9/1973 | Langlais |
| 3,798,684 A | | 3/1974 | Benoit et al. |
| 3,839,753 A | | 10/1974 | Benoit et al. |
| 3,875,356 A | | 4/1975 | Heim et al. |
| 3,889,914 A | | 6/1975 | Torme |
| 3,977,645 A | | 8/1976 | Deely |
| 4,023,757 A | | 5/1977 | Allard et al. |
| 4,079,728 A | * | 3/1978 | Gatts ........................... 600/22 |
| 4,183,015 A | | 1/1980 | Drew |
| 4,183,489 A | | 1/1980 | Copher |
| 4,207,959 A | * | 6/1980 | Youdin et al. .............. 180/167 |
| 4,275,266 A | | 6/1981 | Lasar |
| 4,287,620 A | | 9/1981 | Zur |
| 4,401,852 A | | 8/1983 | Noso |
| 4,410,158 A | | 10/1983 | Maffei |
| 4,432,522 A | | 2/1984 | Pruento et al. |
| 4,435,862 A | | 3/1984 | King et al. |
| 4,453,695 A | | 6/1984 | Sennett et al. |
| 4,465,255 A | | 8/1984 | Hill |
| 4,484,367 A | * | 11/1984 | Jenkins .......................... 5/425 |
| 4,489,454 A | | 12/1984 | Thompson |
| 4,494,259 A | | 1/1985 | Miller et al. |
| 4,520,576 A | | 6/1985 | Vander Molen |
| 4,584,989 A | | 4/1986 | Stith |
| 4,591,124 A | | 5/1986 | Hellenbrand et al. |
| 4,592,104 A | | 6/1986 | Foster et al. |
| 4,612,679 A | | 9/1986 | Mitchell |
| 4,680,790 A | | 7/1987 | Packard et al. |
| 4,768,241 A | | 9/1988 | Beney |
| 4,780,919 A | | 11/1988 | Harrison |
| 4,803,744 A | | 2/1989 | Peck et al. |
| 4,811,435 A | | 3/1989 | Foster et al. |
| 4,821,348 A | | 4/1989 | Pauna |
| 4,846,434 A | | 7/1989 | Krogsrud |
| 4,945,592 A | | 8/1990 | Sims et al. |
| 4,953,244 A | | 9/1990 | Koerber, Sr. et al. |
| 4,963,903 A | | 10/1990 | Cane |
| 5,023,967 A | | 6/1991 | Ferrand |
| 5,072,906 A | | 12/1991 | Foster |
| 5,100,091 A | | 3/1992 | Pollack |
| 5,117,521 A | | 6/1992 | Foster et al. |
| 5,172,147 A | * | 12/1992 | Rockhill ..................... 396/428 |
| 5,172,781 A | | 12/1992 | Hlavinka et al. |
| 5,175,897 A | | 1/1993 | Marra, Jr. |
| 5,186,337 A | | 2/1993 | Foster et al. |
| 5,211,367 A | | 5/1993 | Musculus |
| 5,212,476 A | * | 5/1993 | Maloney ................ 340/825.19 |
| 5,214,360 A | | 5/1993 | Gosner et al. |
| 5,222,132 A | | 6/1993 | Rioux, Jr. |
| 5,230,289 A | | 7/1993 | George et al. |
| 5,239,300 A | | 8/1993 | Berger et al. |
| 5,255,403 A | | 10/1993 | Ortiz |
| 5,267,364 A | | 12/1993 | Volk |
| 5,269,030 A | | 12/1993 | Pahno et al. |
| 5,274,862 A | | 1/1994 | Palmer |
| 5,284,255 A | | 2/1994 | Foster et al. |
| 5,319,816 A | | 6/1994 | Ruehl |
| 5,335,313 A | * | 8/1994 | Douglas ..................... 704/275 |
| 5,335,384 A | | 8/1994 | Foster et al. |
| 5,345,226 A | * | 9/1994 | Rice, Jr. et al. ........ 340/825.19 |
| 5,345,538 A | * | 9/1994 | Narayannan et al. ....... 704/275 |
| 5,370,111 A | | 12/1994 | Reeder et al. |
| 5,377,371 A | | 1/1995 | Foster |
| 5,398,359 A | | 3/1995 | Foster |
| 5,452,807 A | | 9/1995 | Foster et al. |
| 5,461,673 A | | 10/1995 | Coons |
| 5,490,524 A | | 2/1996 | Williams et al. |
| 5,537,453 A | | 7/1996 | Williams et al. |
| 5,542,136 A | | 8/1996 | Tappel |
| 5,542,138 A | | 8/1996 | Williams et al. |
| 5,577,279 A | | 11/1996 | Foster et al. |
| 5,592,153 A | | 1/1997 | Welling et al. |
| 5,600,311 A | * | 2/1997 | Rice et al. ............. 340/825.19 |
| 5,603,133 A | | 2/1997 | Vrzalik |
| 5,611,096 A | | 3/1997 | Bartlett et al. |
| 5,623,736 A | | 4/1997 | Soltani et al. |
| 5,771,511 A | * | 6/1998 | Kummer et al. ............... 5/600 |
| 5,812,978 A | | 9/1998 | Nolan |
| 6,131,868 A | * | 10/2000 | Welling et al. .......... 248/276.1 |

OTHER PUBLICATIONS

Joerns Healthcare's brochure entitled "Roomate".

Joerns Sunrise Medical's Roomate Installation Instructions for Joerns 670.

Joerns Sunrise Medical Manual For Roomate, 5/88.

Prentke Romich's Operational Guide for HECS–3 Hospital Environmental Control System.

Prentke Romich's Operational Guide for HECS–5 Hospital Environmental Control System.

Prentke Romich blueprint "Hill–Rom Century Bed Frame Mount for HECS," Aug. 8, 1988.

Prentke Romich blueprint "HECS–1 Mounting System Assembly," 7/90.

Prentke Romich blueprint "HECS–1 Bed Mounting Bracket".

Prentke Romich blueprint "HECS–1 Mounting Arm," 4/90.

HECS–1 Hospital/Home Environmental Control System Operational Manual.

Joerns blueprint "Flexarm Assembly," Oct. 24, 1986.

Joerns blueprint "Flexarm Sub–Assembly," 1/87.

Color photographs (T3119–3131) of Joerns Roomate™ Device.

Joerns "670 Acute Care Hospital Bed" color brochure.

Prentke Romich blueprint "HECS–1 Transmitter Assembly," 5/90.

Doores, Scott, "Voice Controlled Hospital Unit Provides VIP Treatment", Speakeasy (Scott Instrument Newsletter), 2/91 Issue, p. 2.

Prentke Romich Company, Hospital/Home Environmental Control System Product Brochure, no date.

Quartet Technology, Inc., Simplicity Series 5 Product Brochure.

Hospital Systems, Inc., H.E.R.O. Product Brochure, no date.

KCI Therapeutic Services, Inc. brochure entitled "Access Environmental Control System", 6/97.

KCI Therapeutic Services, Inc. Installation and Operation Instructions, pp. 1,15 and 16.

Crest brochure, 1990.

Voice Activated Bed, Lakeshore testimonials videotape, circa May 1991.

Enhancemate™ Voice Activated Control System testimonal videotape, circa May 1991.

* cited by examiner

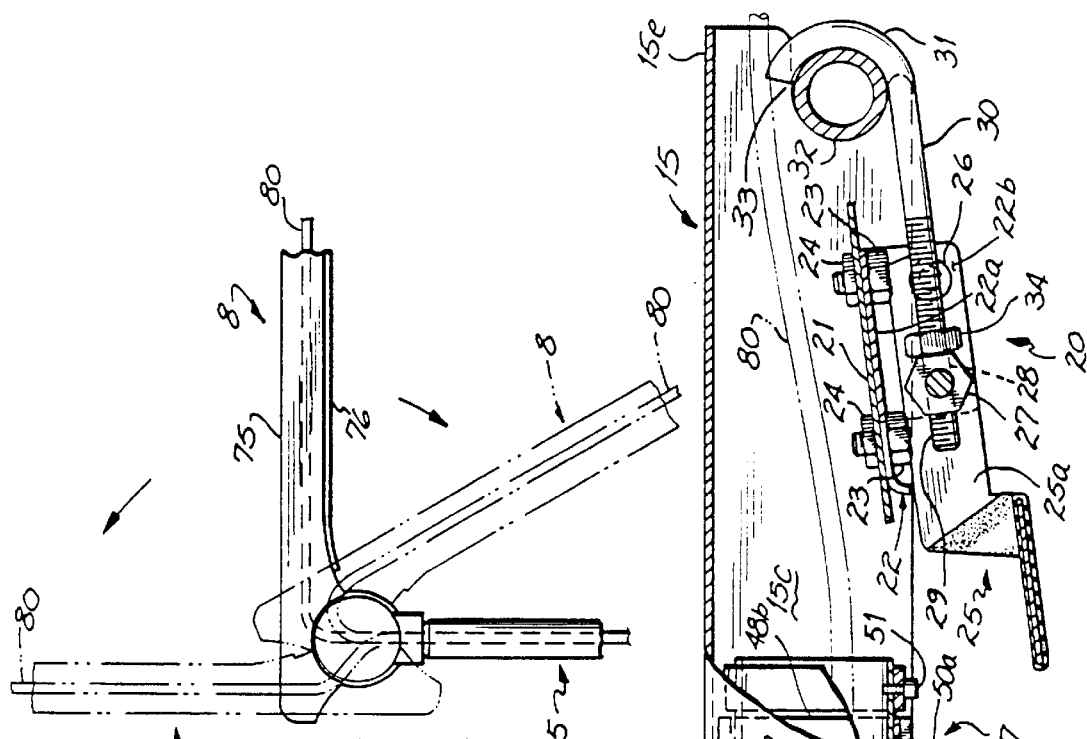
FIG. 9A
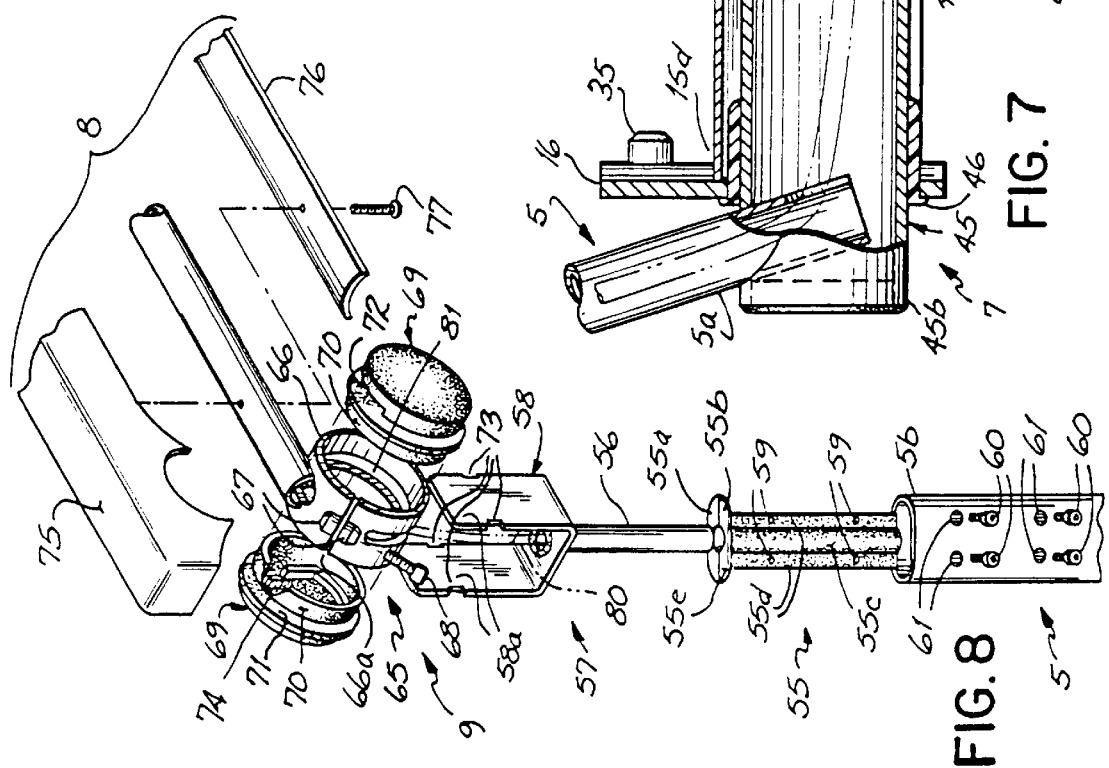
FIG. 7
FIG. 8

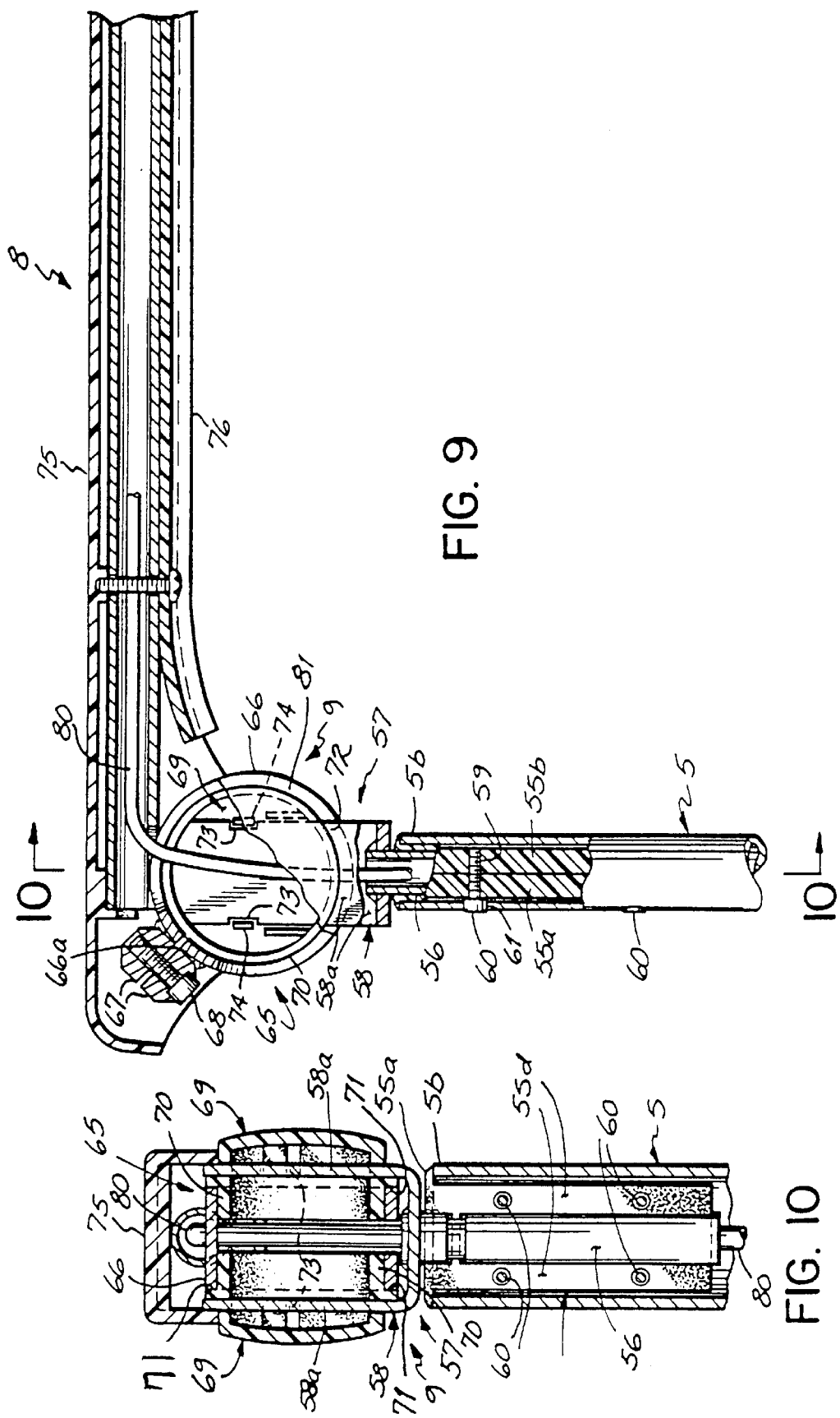

HOSPITAL BED COMMUNICATION AND CONTROL DEVICE

This application is a continuation of U.S. patent application Ser. No. 08/778,961, filed Jan. 6, 1997, which is a continuation of U.S. patent application Ser. No. 08/409,940 filed Mar. 23, 1995, and issued as U.S. patent application Ser. No. 5,592,153 on Jan. 7, 1997, which is a continuation of U.S. patent application Ser. No. 07/984,208, filed Nov. 30, 1992, the disclosure of which is expressly incorporated herein by reference.

FIELD OF THE INVENTION

This invention relates generally to communication and control devices, and more particularly to a communication and control device adapted to be used in conjunction with a hospital bed for activating any one of a number of functions such as bed adjust, mattress adjust, nurse call, room light, reading light, TV and phone.

BACKGROUND OF THE INVENTION

There are many types of devices in the health care industry which allow a patient situated atop a hospital bed to activate a number of communication and control functions, such as adjust bed, adjust mattress, call nurse, room light, reading light, TV and phone. One such device is located in the hospital bed sideguard, as disclosed in U.S. Pat. No. 4,183,015 assigned to the assignee of the present invention. Another such device is disclosed in U.S. Pat. No. 4,680,790, which discloses a bedside control module which may be releasably attached to a hospital bed siderail. These and other prior art devices generally employ one or more push-button or pressure sensitive type switches to activate the various communication and control functions. A common criticism of these types of devices is that a fairly high degree of manual dexterity is required by a patient in order to properly activate these devices. Accordingly, their application is relatively limited.

Various types of voice recognition systems have been developed which further tend to reduce or eliminate the need for relying on the activation of pushbutton or pressure sensitive type switches to provide for "hands free" operation of some types of equipment. In these types of systems, electronics are "trained" to "learn" to associate certain functions with a user's verbal commands, and to carry out or perform those functions upon subsequently receiving the learned verbal commands. Due to the sensitivity of such voice recognition systems, prior art communication and control devices such as those disclosed in U.S. Pat. Nos. 4,183,015 and 4,680,790 are generally ill-suited for use in conjunction therewith. For example, such prior art devices are not generally located adjacent to the patient's head when the patient is situated atop a hospital bed when the communication and control device is either an integral part of or removably secured to the bed sideguard. If the communication and control device is of the type which is located near the head end of the hospital bed, it is generally simply pinned to the mattress on one side or the other of the patient's head, and depending on the particular condition of the patient, the patient may not be able to turn his/her head toward the device in order to speak clearly into the device, thus making such devices ill-suited for voice recognition systems as well.

Other voice recognition devices are known which take the form of either a box which would rest upon a bedside table, or a headset type device which would be worn by the patient. Of these types of devices, the former suffers the drawback that the device is prone to being inadvertently activated by ambient noise as the device must have a high degree of audio sensitivity since it is not located closely adjacent a patient's head. The latter suffers the obvious drawback of having to be worn by a patient, which creates discomfort, etc.

Other types of bedside devices have been developed for more severely disabled patients who suffer both speech and motor disabilities and who, as a consequence, are not able to manipulate push-button type devices or use speech recognition devices. These include so-called "sip and puff" devices where a patient alternately sucks from and blows into a straw type device to generate electrical signals; pillow type switches wherein a patient rocks his/her head to one side to activate the switch within the pillow; tongue activated devices; and even eyebrow activated devices which are adhered directly to a patient's skin adjacent the eyebrow and which are activated upon a patient's raising or lowering his/her eyebrows.

It has therefore been a primary objective of the present invention to provide a communication and control device for use on a hospital bed which is specifically adapted for voice activation of communication and control functions.

It has been a further objective of the present invention to provide an arm mechanism for attachment to a hospital bed for positioning a communication and control module adjacent a patient's head.

SUMMARY OF THE INVENTION

In accordance with the stated objectives of the present invention, the present invention is a communication and control device for use on a hospital bed which comprises a voice recognition communication and control module for activating at least one of a plurality of communication and control functions upon sensing the patient's voice, and arm means connected to the module and adapted to be connected to the hospital bed for positioning the module adjacent to the head of the patient situated atop the bed. The communication and control functions activatable by the module preferably include adjusting the height, configuration and orientation of the hospital bed, adjusting the mattress atop the bed, nurse call, room light, reading light, TV and phone. The module of the communication and control device further advantageously includes an alpha numeric display.

In accordance with other features of the present invention, the communication and control device comprises a first arm segment having first and second ends, mechanism for removably securing the first arm segment to a hospital bed, a second arm segment having first and second ends, a first articulating joint connecting the second end of the first arm segment to the first end of the second arm segment, a third flexible arm segment having first and second ends, the first end being connected to the second end of the second arm segment, a communication and control module for activating at least one of a plurality of communication and control functions and a second articulating joint connecting the communication and control module to the second end of the third flexible arm segment.

The communication and control device of the present invention further advantageously includes a third articulating joint connecting the first arm segment to the removably securing mechanism for allowing the first arm segment to rotate relative to the removably securing mechanism about an axis which is generally parallel to a longitudinal dimension of the bed.

The first articulating joint of the present invention preferably allows the second arm segment to rotate relative to the first arm segment about two axes, one of which is generally perpendicular to the first arm segment and generally parallel to a plane defined by the head end portion of the bed, the other of which is generally collinear with the longitudinal axis of the first arm segment.

The second articulating joint preferably allows the communication and control module to rotate relative to the third flexible arm segment about an axis which is generally collinear with a longitudinal axis of the third flexible arm segment.

The removably securing mechanism of the communication and control device of the present invention preferably takes the form of first and second coupling members in the form of a plate and a hook, and a draw latch for effecting relative movement between the first and second coupling members for connection of the coupling members to a hospital bed.

Electrical transmission wire travels from the first end of the first arm segment through the first, second and third arm segments to the module for sending electrical signals from the communication and control module to various electrical devices. The first articulating joint allows this wire to be substantially contained within the first articulating joint where the wire spans from the first arm member to the second arm member. To do so, the articulating joint comprises a rotatable collar connected to one of the first and second arm members, and a pair of hubs connected to the other of the first and second arm members for rotational connection to the collar, the collar including a circumferential slot for accommodating movement of the wire as the first and second arm members are rotated relative to one another, whereby the first and second arm members may be rotated relative to one another without the electrical transmission wire having to be located external to the joint.

One advantage of the present invention is that it advantageously presents a voice recognition type communication and control module adjacent to a patient's head when the patient is situated atop the hospital bed.

Another advantage of the present invention is that it allows for maximum adjustability of a communication and control module whether a patient is situated atop the hospital bed or is recreating in a chair beside the bed.

Still another advantage of the present invention is that a hospital bed may be readily retrofitted with a communication and control device which presents its voice recognition type communication and control module adjacent to the patient's head when situated atop the hospital bed.

Still another advantage of the present invention is the provision of a novel articulating joint for a communication and control device, or for any other type of electrical device for that matter which employs pivoting arms and which alleviates the need to run electrical transmission wires externally of the pivoting joint.

These and other objects and advantages of the present invention will become more readily apparent during the following detailed description taken in conjunction with the drawings herein, in which:

BRIEF DESCRIPTION OF THE DRAWINGS

FIG. 7 is an enlarged side elevational view in partial cross-section of the means for removably securing the arm to a hospital bed and of the articulating joint means permitting rotation of the first arm segment relative to the removably securing means;

FIG. 8 is an exploded perspective view of the articulating joint means permitting relative rotation of the second arm member relative to the first arm member;

FIG. 9 is an enlarged side elevational view in partial cross-section illustrating the articulating joint means of FIG. 8;

FIG. 9A is a view similar to FIG. 9 illustrating the second arm rotated to its extreme positions; and FIG. 10 is a view taken along line 10—10 of FIG. 9.

DESCRIPTION OF PREFERRED EMBODIMENTS

Figure 1:
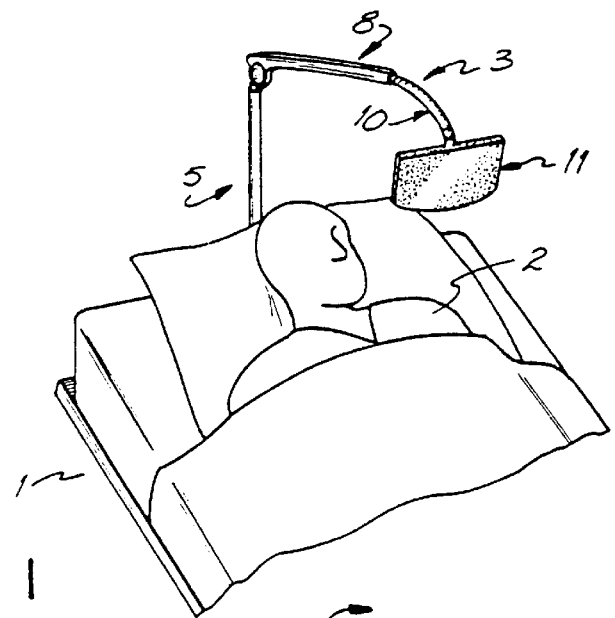
FIG. 1 is a perspective view of a hospital bed outfitted with a communication and control device according to the present invention.
Figure 5:
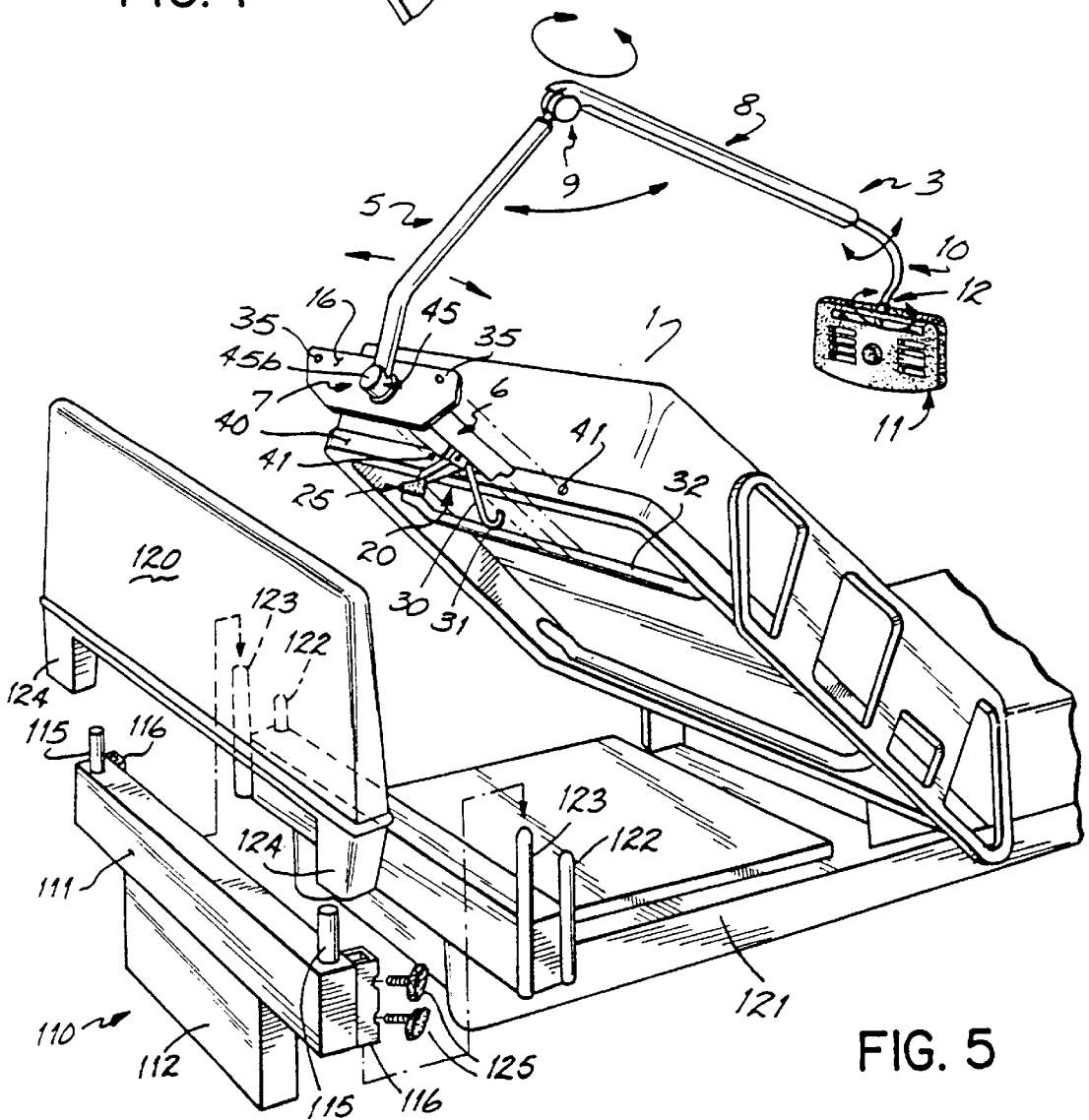
FIG. 5 is a view similar to FIG. 4 illustrating the position of the hospital bed headboard in conjunction with the communication and control device and interface box of the present invention.
Figure 2:
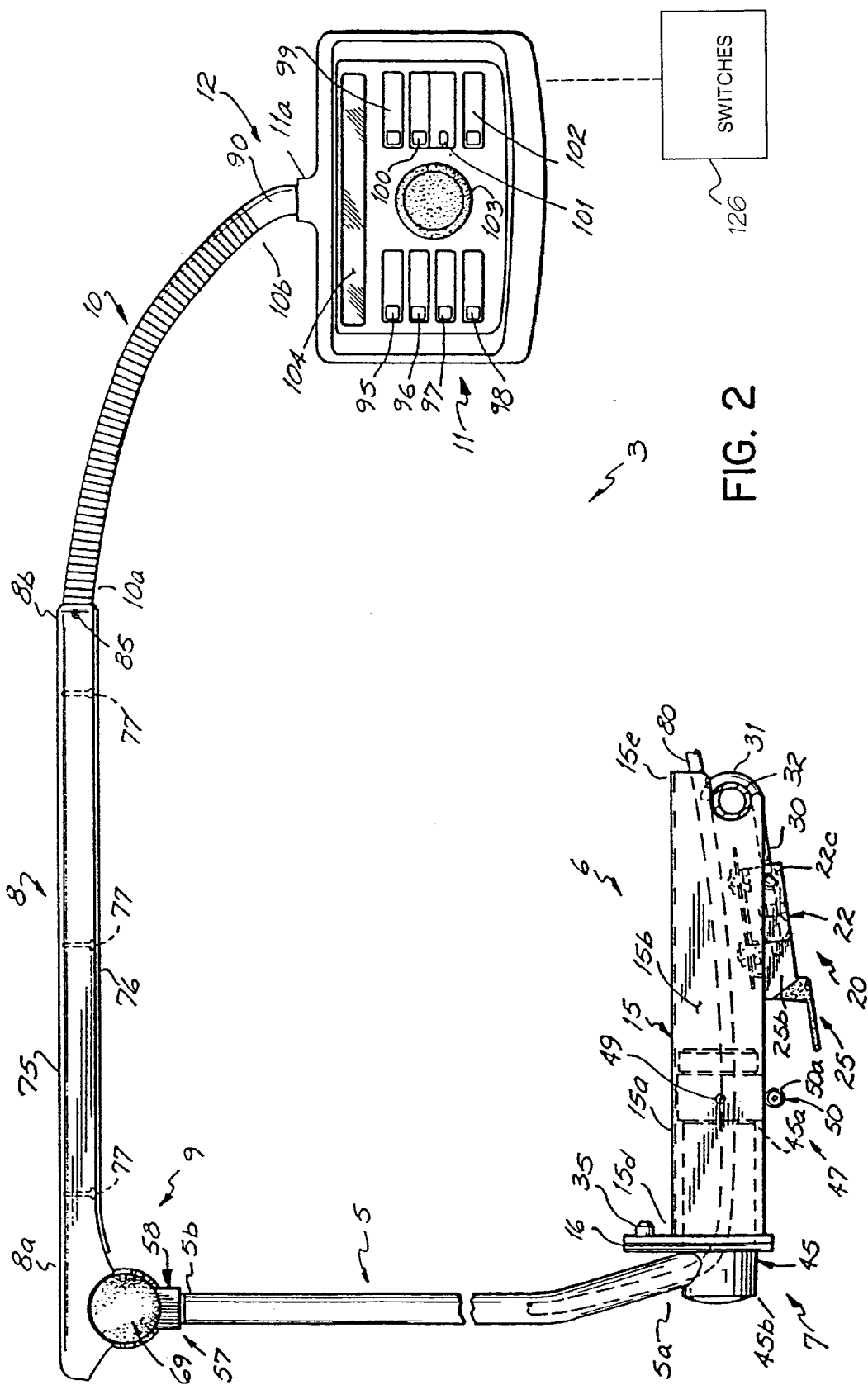
FIG. 2 is a side elevational view of the communication and control device of the present invention.

With reference first to FIG. 1, there is illustrated a hospital bed 1, a patient 2 situated atop the bed 1, and the communication and control device of the present invention indicated generally by the numeral 3 secured to the bed 1 for use by the patient 2. With reference to FIG. 2, the device 3 is shown in side elevation. The device 3 includes, generally, a first arm segment 5, a mechanism 6 for removably securing the first arm segment 5 to a hospital bed 1, an articulating joint 7 which allows the first arm segment 5 to rotate with respect to the securing mechanism 6 and hence the bed 1, second arm segment 8, an articulating joint 9 connecting the first and second arm segment 5, 8 respectively and allowing for relative rotation therebetween, a third arm segment 10 connected to the second arm segment 8, a communication and control module 11 for activating one of a plurality of communication and control functions, and an articulating joint 12 connecting the module 11 to the third arm segment 10. The first, second, and third arm segments 5, 8, and 10 and articulating joints 7, 9, 12 comprise an arm or articulating arm assembly. The bed 1 includes a head end 210, a foot end 212, and first and second sides 214, 216 as shown in FIGS. 1 and 5. The head end 210 includes a head portion or head end portion 218 and a head end edge 220 as shown in FIGS. 1 and 5.

More specifically, the first arm segment includes first and second ends 5a and 5b. Securing mechanism 6 is connected to the first end 5a of first arm segment 5 through the articulating joint 7. With reference to FIG. 7, the securing mechanism 6 and articulating joint 7 are shown with more specificity. More particularly, the securing mechanism 6 takes the form of a downturned channel section 15 having a top wall 15a and two side walls 15b and 15c. The forward end 15d of channel section 15 has fixedly secured there to a plate 16. A pair of locating pins 35 on the aft side of plate 16 serve to locate the plate 16 against supporting bed structure, the operation of which will be subsequently described. Approximately one-third of the way from the aft end 15e of the channel section 15 toward the forward end 15d there is a drawlatch assembly 20 for securing the channel section 15 and plate 16 to a hospital bed 1.

More particularly, as seen in FIG. 7, the drawlatch assembly 20 includes a mounting plate 21 which is fixedly secured to the sidewalls 15b and 15c of he channel section 15. A downturned generally channel section-shaped mounting bracket 22 has a top wall 22a and sidewalls 22b and 22c as shown in FIGS. 2 and 7. Top wall 22a is secured to the mounting plate 21 with bolts 23 and nuts 24. A drawlatch 25 includes substantially identical halves 25a and 25b, the aft ends of each of which are pinned to the respective sidewalls 22b and 22c of mounting bracket 22 via pins 26. A threaded collar 27 is rotatably secured between drawlatch halves 25a and 25b as shown in FIGS. 2 and 7. Threaded hole 28 of collar 27 is threaded to mateably accept the threaded end 29 of rod 30, the other end of which is formed into a U-shaped hook 31. U-shaped hook 31 is formed to curve around a torque tube 32 which forms a part of the support structure of bed 1, the specifics of which will be described subsequently in more detail. Sidewalls 15b and 15c of channel section 15 similarly include U-shaped relieved areas, one of which is shown at 33, to accommodate torque tube 32 on the side opposite to that engaged by hook 31. The effective length of rod 30 between the drawlatch assembly 20 and the torque tube 32 may be adjusted by rotating the rod 30 within the threaded collar 27 to either shorten the distance between collar 27 and hook 31 or lengthen the distance therebetween. When the desired distance is obtained, lock nut 34 on rod 30 is tightened against the collar 27 to prevent any subsequent inadvertent rotation of rod 30 with respect to the collar 27.

With reference to FIG. 5, the communication and control device 3 is shown being mounted to the bed 1. The plate 16 abuts the headboard side of transverse support 40, the support 40 including a pair of holes 41, 41 for receiving the pair of pins 35, 35 located on the mounting plate 16. Hook 31 is positioned underneath and aft of the torque tube 32, and with reference to FIG. 4, the drawlatch 25 is snapped upwardly to cam the hook 31 of rod 30 against the aft side of torque tube 32 and the aft side of plate 16 against the forward side of transverse support 40, thereby securing bed support structure 32 and 40 therebetween.

Referring back to FIG. 7, and describing now the joint 7 with more particularity, end 5a of first arm segment 5 is fixedly secured to a pivot barrel 45 which rotates in a bushing 46 which is press fitted within a circular opening in plate 16. In order to adjust the rotational stiffness of joint 7, aft end 45a of the pivot barrel 45 is disposed within a band brake assembly or adjustable clamp 47 which takes the form of a circular split band or collar or first and second clamping portion 48 secured to the sidewalls 15b and 15c of channel section 15 with screws 49. Tabs 50 are located on either side of the split 48a in the band 48, one of which is threaded to accept screw or adjustment mechanism 50a for adjusting the relative tightness of the band 48 about the pivot barrel 45. A screw 51 in aft end 45a of the pivot barrel 45 serves as a mechanical stop, preventing the pivot barrel 45 from slipping forwardly out of the band brake assembly 47 and also limiting the rotational travel of the arm segment 5 to approximately 180 degrees (90 degrees to either side of vertical); a dimple (not shown) is formed in both of the sidewalls 15b and 15c of the channel section 15 for contact by the screw 51 in the extreme most positions of the arm segment 5 (+and −90 degrees from vertical).

Referring back to FIG. 2, it will be seen that end 8a of second arm segment 8 is connected to end 5b of first arm segment 5 via joint 9. Referring now to FIG. 8, joint 9 as illustrated there in exploded form for clarity. Referring first to end 5b of first arm segment 5, a swivel collar 55 includes matching collar halves 55a and 55b. Referring to collar half 55b, it has a semicircular portion 55c which, when mated with the similar portion of collar half 55A, forms a tubular portion. Collar half 55b further includes a pair of longitudinal flanges 55d, 55d. A transverse flange 55e is located on the upper end of the collar half 55b. The semicircular portion 55c and the matching portion of collar half 55a are adapted to accept a stem 56 of a yoke and stem assembly 57. Connected to the upper end of stem 56 is a yoke 58. Swivel collar halves 55a and 55b fit within the end 5b of first arm segment 5. Holes 59 in the flanges 55d are tapped to accept threaded screws 60 which are inserted through clearance holes 61 in end 5b of first arm segment 5. Tightening of the screws 60 tightens the swivel collar 55 about the stem 56 of the stem and yoke assembly 57 and thereby adjusts the rotational stiffness of the joint 7 when rotating about an axis which is generally collinear with the first arm segment 5.

The joint 9 further includes means providing a second pivot axis for allowing second arm segment 8 to pivot relative to first arm segment 5 about an axis which is generally perpendicular to the longitudinal dimension of the first arm segment 5. A brake band assembly 65 is fixedly secured to end 8a of arm segment 8. The brake band assembly 65 is similar to the band brake assembly 47 of joint 7 described previously, in that there is a split band or collar 66 which includes tabs 67, one of which is located on either side of a split 66, and one of which is threaded for accepting screw 68 for tightening of the band 66. A pair of hubs 69 are fixedly secured to the sides 58a of yoke 58 and serve as a rotational connection between yoke 58 and the split band 66.

More specifically, each hub 69 includes an inwardly facing cylindrical portion 70 which fits relatively snugly within the inside diameter of split band 66. Each hub 69 includes a shoulder 71 which is fitted against the side of the split band 66 when assembling the hubs thereinto. Further, each hub 69 includes a vertically oriented slot 72 which is slightly wider than the width of the sides 58a of the yoke 58. The sides 58a of the yoke 58 are slipped through the slots 72 of the hubs 69 for securing the hubs 69 to the stem and yoke assembly 57. The sides 58A of the yoke 58 include notches 73 which cooperate with inwardly facing tabs 74 within the hubs 69 (FIG. 9) for securing them on to the sides 58a of the yoke 58. Upper and lower decorative shrouds 75 and 76 may be secured to arm segment 8 as with screws 77 (FIG. 2).

In order to route electrical wiring cable or electrical connetor 80 (FIG. 2) through first arm segment 5, through joint 9, and on through second arm segment 8 and ultimately to communication and control module 11. First and second arm segments 5, 8 and articulating joints 7,9 have interconnected hollow interiors as shown, for example, in FIGS. 7–10. More specifically, split band 66 of the brake band assembly 65 includes a circumferential slot 81 which allows cable 80 to be routed through the joint 9 rather than around the joint 9, while still allowing for maximum relative rotation between second arm segment 8 and first arm segment 5. Referring particularly to FIG. 9A, second arm segment 8 is illustrated in its extreme most rotational positions relative to first arm segment 5. As shown in FIGS. 8 and 9A, it will be seen that the circumferential slot 81 accommodates full rotation of arm segment 8 relative to arm segment 5, while allowing the cable 80 to be substantially located within the joint 9 at the point where it spans between arm segment 5 and arm segment 8, rather than having to route the cable 80 around the joint 9 as is done in many prior art electrical devices which employ pivoting arms, such as reading lamps and the like. Such a novel joint mechanism creates a sleek, streamlined joint and avoids the bunching of wire, and ensuing tangling thereof, as is exhibited in many prior art electrical devices employing pivoting arms.

Referring now back to FIG. 2, end 10a of third flexible arm segment 10 is fixedly secured to end 8b of second arm segment 8 as by screws 85. Arm 10 is of the flexible "gooseneck" type which allows control module 11 to be flexed about an axis which is generally perpendicular to the longitudinal dimension of second arm segment 8 within a circumference of 360 degrees.

End 10b of third flexible arm segment 10 is connected to collar 11a of the communication and control module 11. Articulating joint 12 takes the form of a swivel elbow 90. Swivel elbow 90 allows the communication and control module 11 to rotate 360 degrees about an axis which is generally collinear with the longitudinal axis of the swivel elbow 90 at its connection to the collar 11a of the module 11.

Figure 3:
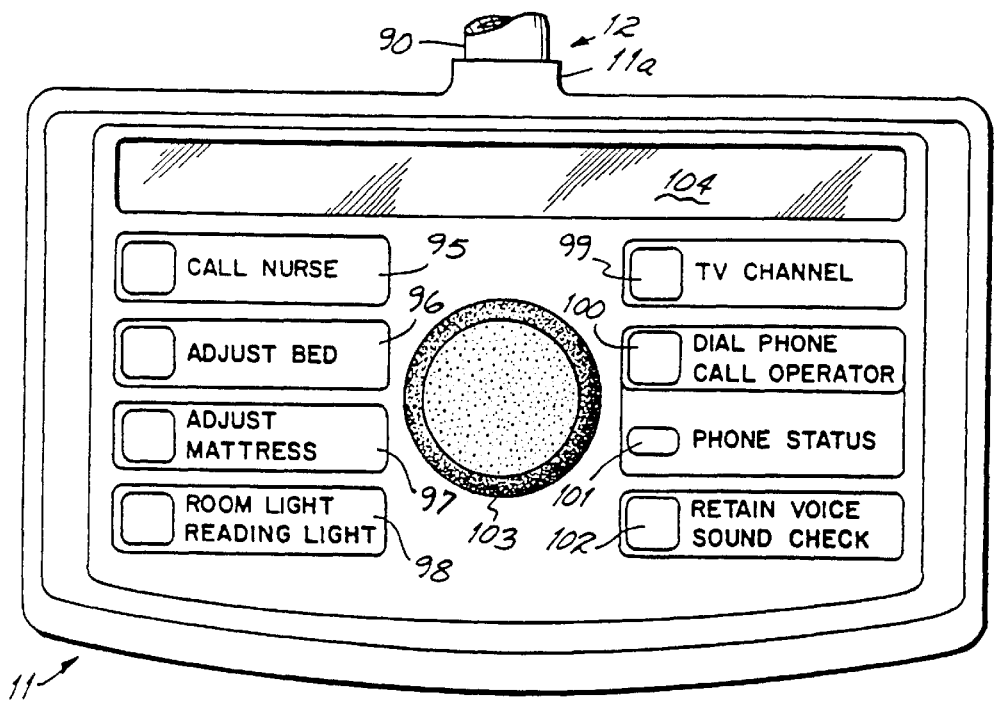
FIG. 3 is the front view of the communication and control module of the device of the present invention.

Referring now to FIG. 3, the communication and control module 11 is shown in greater detail. The module includes a number of communication and control functions with corresponding LED indicator lights. These functions include nurse call 95, adjust bed 96, adjust mattress 97, reading light 98, TV channel 99, phone 100, phone status 101, and retained voice 102. Preferably, the bed adjust function 96 would be operable to adjust the height of the bed, the orientation of the bed (for example, Trendelenburg and reverse Trendelenburg) and bed configuration (for example, chair position). The adjust mattress function 96 would preferably be operable to adjust the relative firmness of, for example, an air inflatable type mattress.

The module 11 further includes a microphone or receiver 103 for receiving voice commands from a patient. Preferably the module 11 further includes an alpha numeric display 104 which would be operable to display, for example, a menu of sub functions once one of the major functions 95–102 is selected.

Figure 6:
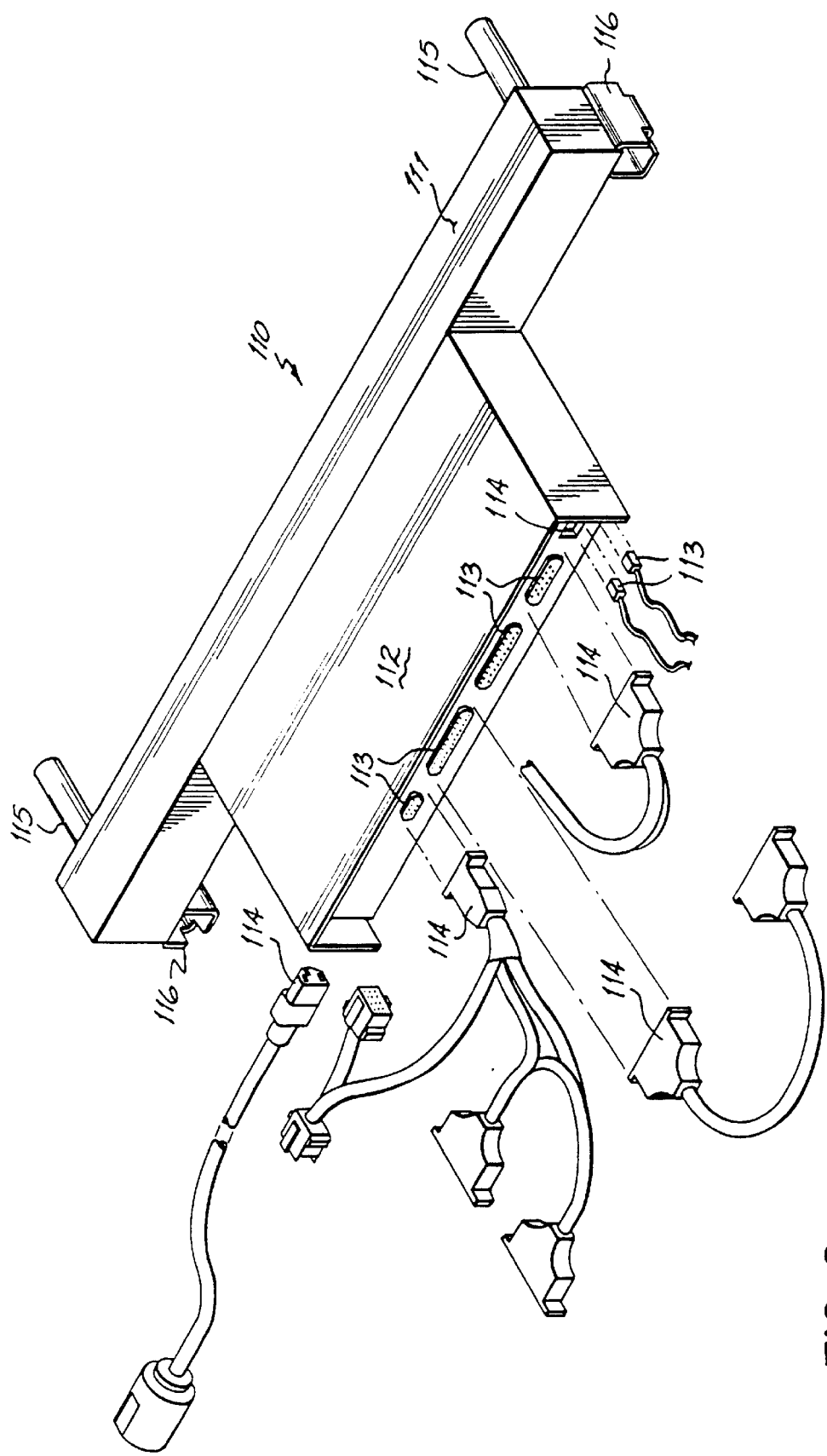
FIG. 6 is a perspective view of the interface box which supports the communication and control device of the present invention.

With reference to FIG. 6, there is illustrated an interface box 110 which is used in conjunction with the communication and control device 3 of the present invention. The interface box 110 is of course in electrical communication with module 11 by virtue of being connected therewith via cable 80, and houses the associated electronics which condition the electrical signals generated by the functions 95–102 and route them to their various associated devices. The box 110 includes a transverse beam structure 111 from which depends a relatively thin rectangular electronics box 112. Along the lower edge of the box 112 are a plurality of male electrical connectors 113 for connection to a plurality of female electrical connectors 114 and associated cable. At opposed transverse ends of the beam structure 111 are a pair of posts 115, 115 and a pair of square sockets 116, 116, the use of which will be subsequently described.

Figure 4:
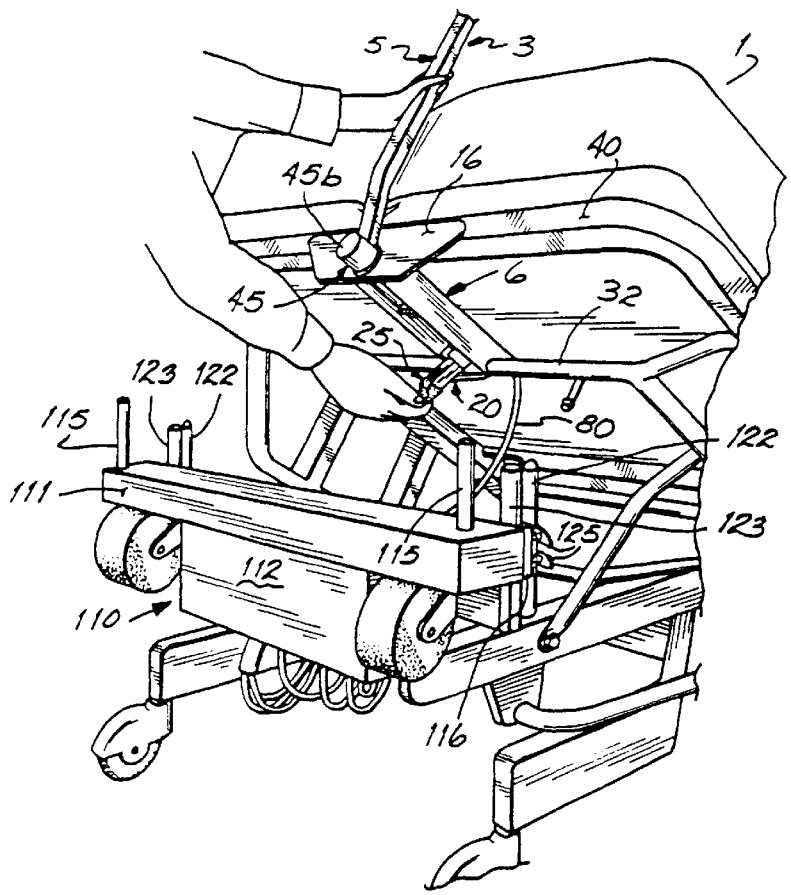
FIG. 4 is a perspective view of a hospital bed being readily retrofitted with a communication and control device of the present invention.

Referring now to FIG. 4, it will be seen that when the device 3 is installed on the bed 1, the forward end 45b of pivot barrel 45 extends forwardly from the head end edge of the bed by a small amount. Raising and lowering of the head end of the bed 1 would result in the forward end 45b of the pivot barrel 45 coming into undesirable contact with the headboard 120 (FIG. 5) when the headboard is in its normal location.

Referring now to FIG. 5, on lower supporting structure 121 of bed 1 there are illustrated two pairs of posts, one pair of which is designated by the numerals 122, 122, and the other of which is designated by the numerals 123, 123. The pair 122, 122 is adapted to receive receptacles 124, 124 of headboard 120 when hospital bed 1 is conventionally operated without the device 3. Due to the projecting end 45b of the pivot barrel 45, however, the headboard 120 must be moved forward by a sufficient distance to allow clearance between headboard 120 and end 45b of pivot barrel 45 when moving the head portion of the bed up and down. Accordingly, posts 115, 115, of interface box 110 (FIGS. 5 and 6) are utilized to place receptacles 124, 124 of headboard 120 thereon in order to support the headboard 120 in a forwardly adjusted position when a bed 1 is so retrofitted with the device 3. The square sockets 116, 116 fit over posts 123, 123 which conventionally employ sockets for the insertion of IV poles (not shown) therein. Thumb screws 125 provide for securing the interface box 110 to the posts 123, 123, the open ended nature of the square sockets allowing the IV pole socket posts 123, 123 to be utilized conventionally with IV poles.

The structural components of the present invention, for example arm segments, securing mechanism and interface box are preferably fabricated of steel. Rotating supports such as the swivel collar, hubs and bushing are preferably fabricated of a crystalline resin material, such as that marketed under the trademark "DELRIN" (trademark of DuPont) or "CELCON" (trademark of Celanese).

In use, interface box 110 is placed atop posts 123, 123 of support structure 121. Headboard 120 is then placed atop posts 115, 115 of the interface box 110. Thumb screws 125 are tightened to secure the box 110 to the posts 123, 123. The open top nature of the square sockets 116, 116 allows a care provider to utilize the IV pole sockets of the posts 123, 123 for insertion of IV poles therein if so desired.

The communication and control device 3 is installed on to the bed 1. The pair of pins 35, 35 on plate 16 are indexed into the pair of holes 41, 41 of transverse support 40 while hook 31 of the securing mechanism 6 is secured around torque tube 32. Draw latch 25 of the draw latch assembly 20 is then cammed upwardly, thus effecting relative movement between the hook 31 and plate 16 securely fastening the same on opposed sides of the transverse support 40 and torque tube 32.

Appropriate connections are then made between module 11 and box 110 by connecting cable 80 therebetween, and connectors 114 are connected to connectors 113 of box 110 thereby connecting the device electronics to various other devices to be controlled with module 11.

The device 3 may then freely be adjusted to any position which is accommodating to a patient situated atop the bed 1 or recreating beside the bed, for example in a chair (not shown). First, the first arm segment 5 is rotatably adjustable by virtue of joint 7 about an axis which is approximately parallel to a plane defined by the head end portion of the bed 1, through an angle of approximately a 180 degrees. Second, second arm segment 8 is adjustable relative to first arm segment 5 about two axes, one of which is generally perpendicular to a longitudinal dimension of the first arm segment 5 and generally parallel to the plane defined by the head end portion of the bed, the other of which is generally collinear with a longitudinal axis of the first arm 5. Third, flexible arm segment 10 may be adjusted to many different configurations relative to second arm segment 8. Lastly, module 11 can be rotated 360 degrees about an axis which is generally collinear with the end of the gooseneck arm 10 which connects to the module 11 by virtue of joint 12.

The communication and control module 11 could be modified and/or supplemented with other controls. For example, the LEDs on the module 11 could incorporate either pressure sensitive type switches or conductive switches in order to make the module 11 more versatile, that is to accommodate both voice activation and push-button or touch sensitive activation. Further, other types of switches 126 (FIG. 2) could be used in conjunction with the device of the present invention, such as the "sip and puff" type, pillow type, tongue type and eyebrow type actuated switch devices.

The communication and control device of the present invention can not only accommodate various positions to suit a patient situated atop a hospital bed, but could as well be positioned for use by a patient not situated atop the bed, but positioned adjacent the bed, for example when recreating in a chair. Further, device 3 of the present invention may be compactly folded for transport, etc., by rotating first arm segment 5 to a position generally parallel to the front side of the head end portion of the bed and rotating second arm, segment 8 to a position generally parallel to the side of the head end portion of the bed. In addition, the device 3 of the present invention could be used on other types of patient supports other than beds, for example wheelchairs, gurneys and the like.

Those skilled in the art will readily recognize numerous adaptations and modifications which can be made to the present invention and which will result in an improved communication and control device, yet all of which will fall within the spirit and scope of the present invention as defined by the following claims. Accordingly, the invention is to be limited only by the following claims and their equivalents.

What is claimed is:

1. A communication and control device for a bed including a head portion and a support, the communication and control device comprising
   an arm having a first end and a second end,
   a securing mechanism configured to couple the first end of the arm to the support, and
   a voice recognition communication and control module coupled to the second end of the arm, the module including a microphone and a display.

2. The communication and control device of claim 1, wherein the arm is configured to position the module adjacent to a head portion of the bed.

3. The communication and control device of claim 2, wherein the head portion is movable between a down position and an up position and the support is configured to move with the head portion so that the voice recognition communication and control module moves with the head portion.

4. The communication and control device of claim 2, wherein the head portion is movable between a down position and an up position and the arm is configured to articulate so that the voice recognition communication and control module is movable between a first position when the head portion is in the down position and a second position when the head portion is in the up position.

5. The communication and control device of claim 1, wherein the arm is configured to move between a stored position compactly folded adjacent a head end of the bed and a use position.

6. The communication and control device of claim 1, wherein the arm is configured to move between a stored position adjacent a head end edge of the bed and a use position.

7. The communication and control device of claim 1, further comprising an interface interposed in electrical communication between the module and a device.

8. The communication and control device of claim 7, further comprising a plurality of devices, the interface being interposed in electrical communication between the module and each device.

9. The communication and control device of claim 7, wherein the interface is enclosed in an interface box fixed to the bed.

10. The communication and control device of claim 1, further comprising a housing coupled to the second end of the arm, the housing carrying the module.

11. The communication and control device of claim 10, wherein the module includes pressure sensitive switches.

12. The communication and control device of claim 10, wherein the module includes conductive switches.

13. The communication and control device of claim 10, wherein the module includes sip and puff switches.

14. The communication and control device of claim 10, wherein the module includes pillow switches.

15. The communication and control device of claim 10, wherein the module includes tongue actuated switches.

16. The communication and control device of claim 10, wherein the module includes eyebrow actuated switches.

17. The communication and control device of claim 1, wherein the arm is configured to move the module relative to the bed.

18. The communication and control device of claim 1, wherein the display is an alpha numeric display.

19. The communication and control device of claim 1, wherein the display includes LED indicator lights.

20. The communication and control device of claim 1, wherein the support comprises a lower supporting structure, and a head portion of the bed is movable relative to the lower supporting structure between a down position and an up position.

21. A communication and control device for a bed including a head portion and a support, the communication and control device comprising
    an arm having a first end and a second end,
    a securing mechanism configured to couple the first end of the arm to the support,
    a voice recognition communication and control module coupled to the second end of the arm, the module including a microphone and a display,
    an interface interposed in electrical communication between the module and a device, and
    wherein the device is movable between an actuated position and a non-actuated position in response to a signal from the module.

22. The communication and control device of claim 21, wherein the device calls a nurse when the device is actuated.

23. The communication and control device of claim 21, wherein the device at least one of turns on and off a light when the device is actuated.

24. The communication and control device of claim 21, wherein the device turns a television at least one of on and off when the device is actuated.

25. The communication and control device of claim 21, wherein the device at least one of places and receives telephone calls when the device is actuated.

26. The communication and control device of claim 21, wherein the device adjusts the height of the bed when the device is actuated.

27. The communication and control device of claim 21, wherein the device adjusts the configuration of the bed when the device is actuated.

28. The communication and control device of claim 21, wherein the device adjusts the position of a mattress when the device is actuated.

29. A communication and control device for a bed including a support, the communication and control device comprising an arm having a first end and a second end,
a securing mechanism configured to couple the first end of the arm to the support, and
a housing coupled to the second end of the arm, the housing carrying a voice recognition communication and control module.

30. The communication and control device of claim 29, wherein the control module includes pressure sensitive switches.

31. The communication and control device of claim 29, wherein the control module includes conductive switches.

32. The communication and control device of claim 29, wherein the control module includes sip and puff switches.

33. The communication and control device of claim 29, wherein the control module includes pillow switches.

34. The communication and control device of claim 29, wherein the control module includes tongue actuated switches.

35. The communication and control device of claim 29, wherein the control module includes eyebrow actuated switches.

36. The control assembly of claim 29, wherein the arm is configured to move the housing relative to the bed.

37. The communication and control device of claim 29, wherein the bed further comprises a head portion including the support, and the head portion is movable between a down position and an up position.

38. The communication and control device of claim 29, wherein the support comprises a lower supporting structure, and a head portion of the bed is movable relative to the lower supporting structure between a down position and an up position.

39. A communication and control device for a bed including a head portion and a foot portion, communication and control device comprising an arm having a first end and a second end,
a securing mechanism configured to couple the first end of the arm to the head portion, and
a voice recognition communication and control module coupled to the second end of the arm, the module including a microphone and a display.

40. The communication and control device of claim 39, wherein the head portion includes a support configured to move between a down position and an up position, and the arm is coupled to the support.

41. The communication and control device of claim 39, wherein the head portion is movable between a down position and an up position and the arm is configured to articulate so that the voice recognition communication and control module is movable between a first position when the head portion is in the down position and a second position when the head portion is in the up position.

42. The communication and control device of claim 39, wherein the arm is configured to move between a stored position compactly folded adjacent a head end of the bed and a use position.

43. The communication and control device of claim 39, wherein the arm is configured to move between a stored position adjacent a head end edge of the bed and a use position.

44. The communication and control device of claim 39, further comprising an interface interposed in electrical communication between the module and a device.

45. The communication and control device of claim 44, further comprising a plurality of devices, the interface being interposed in electrical communication between the module and each device.

46. The communication and control device of claim 44, wherein the interface is enclosed in an interface box fixed to the bed.

47. The communication and control device of claim 39, wherein the arm is configured to move the module relative to the bed.

48. The communication and control device of claim 39, further comprising a housing coupled to the second end of the arm, the housing carrying the module.

49. The communication and control device of claim 48, wherein the module includes pressure sensitive switches.

50. The communication and control device of claim 48, wherein the module includes conductive switches.

51. The communication and control device of claim 48, wherein the module includes sip and puff switches.

52. The communication and control device of claim 48, wherein the module includes pillow switches.

53. The communication and control device of claim 48, wherein the module includes tongue actuated switches.

54. The communication and control device of claim 48, wherein the module includes eyebrow actuated switches.

55. A communication and control device for a bed including a head portion and a foot portion, communication and control device comprising an arm having a first end and a second end,
a securing mechanism configured to couple the first end of the arm to the head portion,
a voice recognition communication and control module coupled to the second end of the arm, the module including a microphone and a display,
an interface interposed in electrical communication between the module and a device, and
wherein the device is movable between an actuated position and a non-actuated position in response to a signal from the module.

56. A communication and control device for a bed including a head portion and a support, the communication and control device comprising an arm having a first end and a second end,
a securing mechanism configured to couple the first end of the arm to the head portion,
a voice recognition communication and control module coupled to the second end of the arm,
a communication link interposed intermediate the voice recognition communication and control module and a device, and
wherein the device is movable between an actuated condition and a non-actuated condition in response to a signal from the voice recognition communication and control module.

57. A communication and control device for a bed including a head portion and a support, the communication and control device comprising an arm having a first end and a second end,
a securing mechanism configured to couple the first end of the arm to the support,
a housing coupled to the second end of the arm, the housing carrying a voice recognition communication and control module,
a communication link interposed intermediate the voice recognition communication and control module and a device, and wherein the device is movable between an actuated condition and a non-actuated condition in response to a signal from the housing.

58. A communication and control device for a bed including a head portion and a support, the communication and control device comprising an arm having a first end and a second end, a securing mechanism configured to couple the first end of the arm to the support, the second end of the arm cantilevered from the securing mechanism, a voice recognition communication and control module coupled to the second end of the arm, and wherein the arm extends between the voice recognition communication and control module and the securing mechanism and above the head portion for variably positioning the voice recognition communication and control module, in a cantilevered position from the support, to be located above a patient resting on the bed and in close proximity to a head of the patient.

59. A communication and control device for use in combination with a bed including a head portion and a support, the communication and control device comprising an arm having a first end and a second end, a securing mechanism configured to couple the first end of the arm to the support, a first articulating joint coupling the first end of the arm to the securing mechanism, a voice recognition communication and control module coupled to the second end of the arm, and a second articulating joint coupling the second end of the arm to the voice recognition communication and control module.

* * * * *